Jan. 16, 1968     T. E. DRISKELL ET AL     3,363,995
BRINE PRODUCTION PROCESS
Filed Feb. 10, 1964
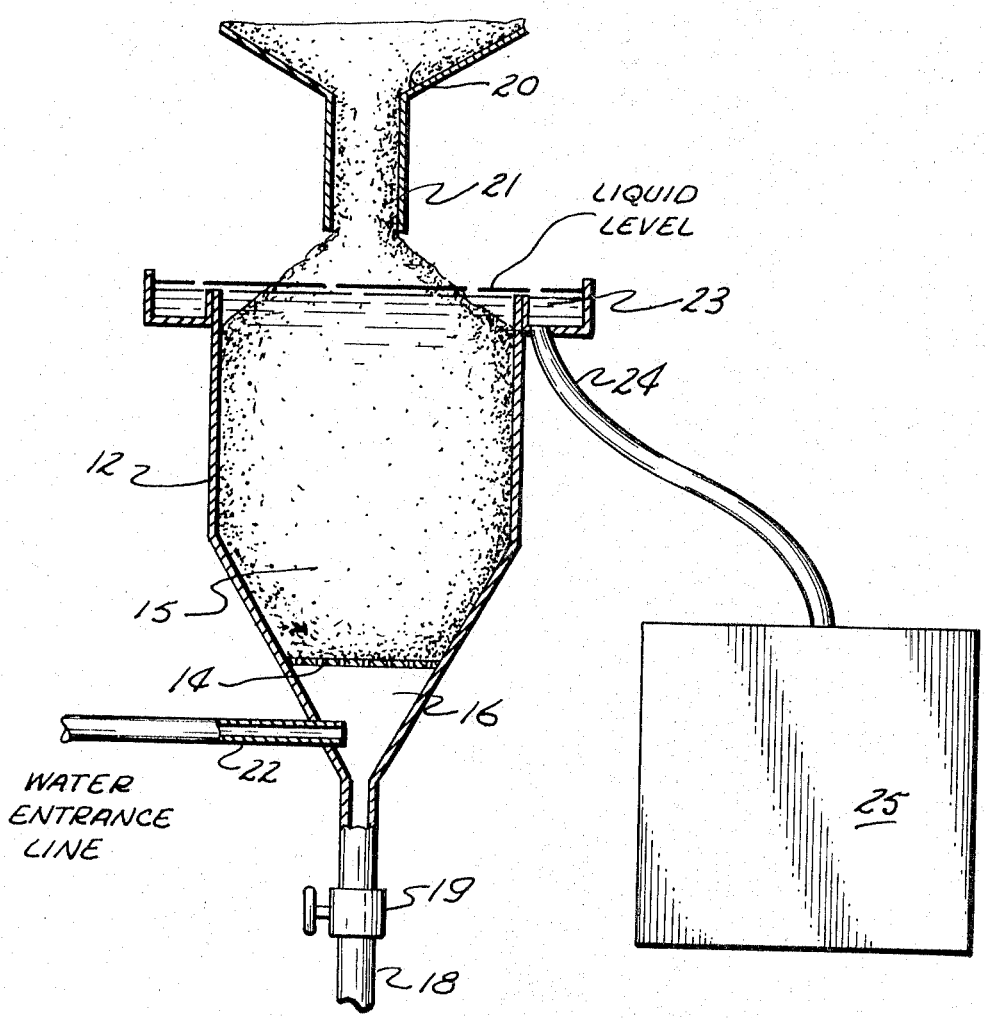
Fig. I
INVENTOR.
Thomas E. Driskell
Donald M. Heath
BY Pendleton, Neuman,
Seibold & Williams
Attorneys

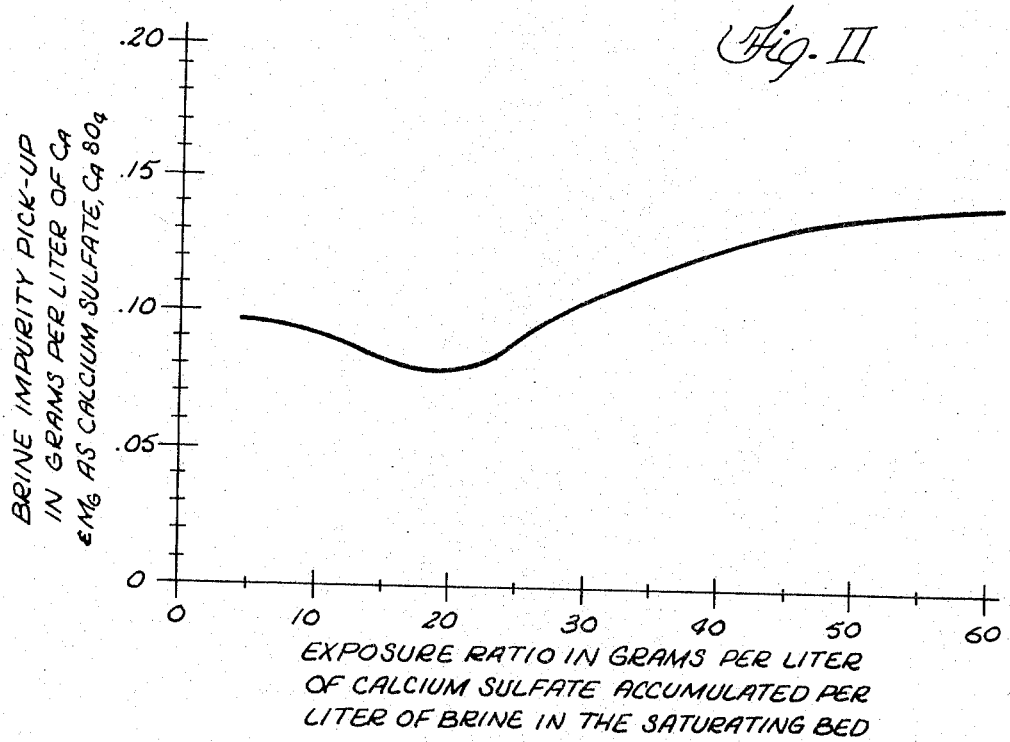
Fig. II
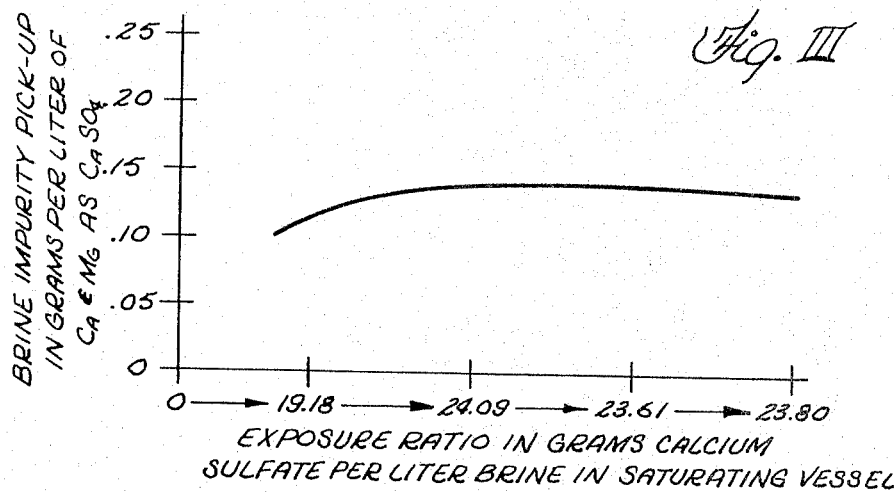
Fig. III
INVENTOR.
Thomas E. Driskell
Donald M. Heath
BY Pendleton, Neuman,
Seibold & Williams
Attorneys

United States Patent Office 3,363,995
Patented Jan. 16, 1968

3,363,995
BRINE PRODUCTION PROCESS
Thomas E. Driskell, Chicago, and Donald M. Heath, La Grange, Ill., assignors to Morton International, Inc., a corporation of Delaware
Filed Feb. 10, 1964, Ser. No. 343,814
3 Claims. (Cl. 23—312)

This invention relates to the production of sodium chloride brines.

Sodium chloride brines are employed in industry in numerous applications. For example, sodium chloride brines are used in the meat packing industry for canning hams and other meats; in the canning industry for canning vegetables such as peas, lima beans and the like; and in the textile industry to assist the setting of textile dyes. Saturated brine is produced for use in these various applications by passing water through a bed of sodium chloride during which process solubilization of a large proportion of the naturally occluded impurities, such as calcium sulfate, may occur.

In the majority of these industrial applications it is highly desirable or necessary that the calcium sulfate content of the brine be maintained at a very low or minimum value for one reason or another. For example, the presence of large amounts of calcium sulfate in brines employed in the meat packing industry is undesirable since it chemically reacts with the phosphate compounds employed in meat packing thereby reducing their effectiveness for the intended purpose. The presence of calcium sulfate in brines employed in the canning of vegetables often causes the skins of the canned vegetables to become hard, thus reducing their value to less than that of a prime product. Likewise, large amounts of calcium sulfate in brines employed in the textile industry increases the amount of dyes which need be employed and often results in mottling of the dyed textiles.

It is thus apparent that in numerous applications it is necessary to avoid the use of sodium chloride brines containing large amounts of calcium sulfate. Screened grades of commercial rock salt which are available for use by these consumers contain appreciable amounts of calcium sulfate as a major contaminant, thus limiting the suitability of such rock salts even though their cost and availability factors greatly favor their use. The anhydrous calcium sulfate upon exposure to moisture become soluble in the brine during the brine saturation operation. Since chemical treatment of the brine for the removal of contaminants is economically prohibitive the salt consumers have heretofore employed a refined grade of salt from which contaminants have been susbtantially removed.

When brine is produced from rock salt it is customary to employ a salt saturating unit having a relatively large capacity in order to hold an ample supply of sodium chloride or alternatively, in some instances, several multiple saturators are employed to facilitate handling of the salt supply and to insure continuous and substantially complete saturation of the brine. In other cases, the calcium sulfate being less soluble in the brine than the sodium chloride, tends to accumulate steadily in a salt saturating zone. Since the salt saturating units are cleaned only very infrequently, the solute is exposed to considerable amounts of this calcium sulfate sludge which tends to increase pickup or solubilization of calcium sulfate in the brine. By operating in the above manner, the brine normally produced would be generally unsatisfactory due to the level of calcium sulfate contamination. Moreover, removal of sludge would considerably increase the brine production costs.

It is therefore a principal object of this invention to provide a process for producing brine utilizing sodium chloride containing calcium sulfate as a contaminant wherein pickup of calcium or sulfate ion contaminants is minimized.

It is a further object of this invention to provide an economical and convenient process for producing brine from screened grades of rock salt wherein the brine is of desired purity.

It is another more specific object of this invention to provide a process for producing substantially saturated brine wherein water is passed through a bed of sodium chloride containing calcium sulfate as a contaminant; the saturation process being carried out under such conditions that the solubilization of calcium ion and sulfate ion contaminants is minimized.

The present invention is predicated on the discovery that solubilization of calcium sulfate in brine during saturation thereof with crude or impure sodium chloride can be effectively minimized by controlling certain conditions under which the saturation is accomplished.

One of these conditions relates to the type of rock salt employed in the saturation process. As previously mentioned, all types of rock salt contain appreciable amounts of calcium sulfate as a natural contaminant. It was unexpectedly found that a type of salt known as Southern Rock Salt is peculiarly and uniquely adaptable to the present process in which the amount of calcium sulfate pickup is regulated. The reason lies in the chemical nature and particle size distributions of the calcium sulfate present in this type of salt. It was discovered that the form of the calcium sulfate of Southern mine run rock salt is predominantly anhydrous calcium sulfate (about 96%), otherwise known as anhydrite, whereas the calcium sulfate of Northern Rock Salt is only about 80% anhydrite, the remainder being $CaSO_4 \cdot 2H_2O$, a form known as gypsum. Anhydrite is a very dense variety of calcium sulfate, having a specific gravity of 3.0. Gypsum is lighter than anhydrite, having a specific gravity of 2.37.

The particle size distribution of the calcium sulfate of Southern mine run rock salt compared with Northern Rock Salt is presented in Table I (typical analysis).

TABLE I

| U.S. Std. Mesh | Southern Mine Run Rock Salt, Percent Retained | Northern Rock Salt, Percent Retained |
|---|---|---|
| 30 | 0.4 | 35.6 |
| 40 | 2.0 | 2.0 |
| 50 | 14.6 | 4.7 |
| 70 | 23.5 | 2.1 |
| 100 | 25.7 | 0.2 |
| 140 | 17.1 | 21.9 |
|  | 80.9 | 30.9 |
| 200 | 9.2 | 14.9 |
| 400 | 6.1 | 18.6 |
| Pan | 15.3 | 33.5 |
|  | 0.8 |  |

As can be seen from an examination of the above table, the particle size distribution of calcium sulfate in Southern Mine Run Rock Salt is relatively uniform, and that more than 80% by weight is found in the 40 to 140 mesh size range. By contrast, the particle size distribution of the calcium sulfate impurity of Northern Rock Salt is rather irregular, having only 30.9% in the 40 to 140 mesh size range, with 33.5% in the very fine particle size range and 35.6% in the range which may be classified as coarse (30 mesh).

Thus, the type of calcium sulfate impurity present in rock salt is important in the present invention because the high density of the anhydrite in Southern Rock Salt assures that, in the present brine saturation system, exposed particles of calcium sulfate gravitate downward through the interstices of the sodium chloride bed and will not be carried along by the flowing brine. Of equal importance to the present invention is the calcium sulfate particle size distribution of Southern Mine Run Rock Salt which, by contrast with Northern Rock Salt, exposes a small surface area to solvent and is not as quickly dissolved by a stream of solvent as is the calcium sulfate present in other rock salts.

Since this invention relates to the use of a particular type of salt containing a calcium sulfate impurity substantially in the anhydrite form and a definite anhydrite particle size distribution, the velocity of solvent flow through the salt bed in the saturator of the present process must not exceed that velocity which is capable of hydraulically supporting the anhydrite particles. It is important to this invention that the velocity of the liquid be such that anhydrite particles exposed in the dissolving process gravitate downward and deposit at the base of the saturating bed. It has been found that if the velocity of liquid through the system exceeds substantially about 1 foot per minute, then the fine particles of anhydrite begin to be carried along with the brine stream.

Another condition relates to the regulation of time of contact (residence time) between brine and settled-out calcium sulfate whereby the calcium and sulfate pickup by the brine is maintained at a pre-determined level. In accordance with the present discovery, solubilization of calcium sulfate during saturation is minimized and controlled by limiting the length of time (residence time) a given volume of solvent remains within the saturating zone in contact with the sodium chloride to be dissolved and also by limiting the amount of calcium sulfate sludge which accumulates in the salt saturating zone. This ratio of calcium sulfate sludge to brine in the saturating zone can, for convenience, be defined herein as "exposure ratio" and represents the amount of calcium sulfate in grams present in the sodium chloride saturating zone per liter of brine present therein.

In view of the several interrelated processing variables, it becomes difficult to set clear limits on the residence time of the aqueous solute in the salt saturating zone or the exposure ratio, although both factors are critical for any specific brine saturation system. Accordingly, the critical limits set forth herein may vary depending upon the specific conditions employed in the brine saturating system in which the present invention is utilized. In general, when employing crude Southern dome type screened rock salt containing from 0.7 to 0.9% calcium sulfate by weight for saturation of substantially neutral water (pH about 7) at a temperature from about 40 to 80° F., the contact time or residence time of the brine within the saturating zone is limited to not more than about 10 minutes and preferably is maintained at about 3 or 4 minutes and the velocity of liquid flowing in the system does not exceed about 1 foot per minute. It will be apparent that the residence time within the saturating zone of the brine can be readily determined by routine calculation based on the rate of flow of the influent solvent, the size of the saturating zone or the salt bed and the rate of brine withdrawal. The size of the salt bed and the salt saturator inflow and outflow rates can be optimized to obtain a desired residence time.

Similarly, the exposure ratio, that is the amount of calcium sulfate sludge permitted to remain in contact with liquid within the salt saturating zone is limited to not more than from about 20 to 40 grams of calcium sulfate per liter of brine. The removal of calcium sulfate sludge from the sodium chloride saturating zone can be readily accomplished continuously or at periodic intervals by several means. For example, as shown in FIGURE 1 in the drawing which accompanies this specification, a salt saturating unit 12 can be provided with a perforated plate 14 which supports the sodium chloride salt bed 15 thereabove, but which permits the calcium sulfate to pass through and to accumulate in the lower section 16 of the unit through which it can be removed through an outlet 18 controlled by valve 19. The particle size and the specific gravity of the sludge material is generally such that it will readily pass through a 12 mesh perforated screen and accumulate in the lower section 16 of the unit while the sodium chloride crystals remain supported by the screen. The sodium chloride to be dissolved, stored in hopper 20, is introduced at the top of the saturator unit 12 through feed line 21 while the water to be saturated is introduced through line 22 and flows up through the salt bed. The saturated brine collects at the top of the saturator in overflow ring 23 and from there is sent via line 24 to a saturated brine collection tank 25 from which it can be utilized as desired.

The advantages of the present invention are readily apparent from comparison of the data presented in the following tables and in the graphs.

The advantages of the present invention are apparent when operating a typical saturating unit in which the saturating conditions were maintained substantially identical, except for variation of the contact time (residence time) of the solvent water within the saturating bed, the exposure ratio and the utilization of Southern screened grade rock salt. These runs were conducted using a typical low sodium content raw water supply, maintained at an effluent temperature of 60–70° F. and low and relatively neutral in pH.

The effect of varying the *contact time* or *residence time* is shown by a comparison of a series of dissolving runs in Table I. In each run the contact time was varied from 1.98 minutes to 11.2 minutes. Conditions of temperature, exposure ratio, and type of salt remained essentially constant; the only substantial variation being the contact time. The effluent brine was periodically and uniformly sampled and analyzed for its gain in calcium and magnesium in terms of $CaSO_4$. It is evident that Runs 2 through 4 were very acceptable and consistent brine impurity pickup results were obtained. With contact times greater than 6 minutes, the impurity pickup increased while with a contact time of less than 2 minutes the velocity of the brine exceeded 1 foot per minute with a consequent rise in impurity solubility due to its being hydraulically carried.

TABLE I.—DISSOLVING RUNS 1 THROUGH 5 USING SOUTHERN SCREENED ROCK SALT

| Run | Contact Time, min. | Calcium and Magnesium as $CaSO_4$ Impurity Pickup |
|---|---|---|
| 1 | 11.2 | 0.1530 |
| 2 | 4.5 | 0.1121 |
| 3 | 3.5 | 0.1152 |
| 4 | 2.48 | 0.1156 |
| 5* | 1.98 | 0.1635 |

*Velocity exceeded 1 foot per minute through bed of salt.

To illustrate the effect of exposure ratio on the gain or pickup of soluble calcium sulfate in such systems, reference is made to FIGURE II. In FIGURE II the calcium sulfate pickup in grams per liter of calcium sulfate is plotted as the ordinate and the exposure ratio in grams of $CaSO_4$ accumulating to the system per liter of brine static to the saturator is plotted as the abscissa. It is easily observed that within the exposure ratio range of 20 to 40 grams per liter $CaSO_4$ range the gain in impurity in the resultant brine should be easily maintained within a brine impurity pickup range of .09 to .12 gram per liter $CaSO_4$.

The data herein depicted in FIGURE II relates to a specific set of optimum conditions with respect to temperature, water source purity and neutrality and particular screened grade of rock salt used. All of these specific and minor conditions may vary in an actual industrial application of the principles of the invention and such variations are encompassed by the invention. It is apparent that these results would not be attained without employment of the essential principles of this invention.

To illustrate that the level of calcium sulfate pickup or gain can be maintained within an acceptable, controllable and relatively narrow range by providing for the periodic removal of accumulating calcium sulfate, reference is hereby made to FIGURE III. In FIGURE III the brine impurity pickup or gain is plotted as the ordinate and the allowed exposure ratio build-up is plotted as abscissa in grams per liter of $CaSO_4$ exposure per liter of brine contained within the salt dissolving bed. In this test an attempt was made to stay within the previously stated allowable range of exposure ratio before an insoluble impurity removal was performed.

FIGURE III demonstrates that the calcium sulfate pickup ranges of from 0.125 to 0.14 gram per liter pickup can be maintained by controlling the exposure ratio range. If an exposure ratio of from 20 to 40 grams instead of the exhibited 20 to 24 grams per liter range of exposure ratios is maintained there may be a consequent variation of calcium sulfate pickup in the resultant brine produced.

To illustrate the particular advantages of the invention with the use of Southern screened grade of rock salt, reference is made to Table II wherein two dissolving test results are recorded. During the performance of each test all conditions were maintained to be substantially identical as noted by the near equality of the contact times used, namely 4.44 and 4.485 minutes. The Northern screened grade of rock salt gave a resultant brine of 0.728 gram per liter $CaSO_4$ average pickup. It is noticeable that in this test the brine impurity pickup was substantially higher than the test results using Southern screened grades of rock salt.

TABLE II.—DISSOLVING RUNS 3 AND 6
[Average brine impurity pickup in calcium and magnesium as $CaSO_4$ grams per liter]

| Run 3—Southern Screened Rock Salt | Run 6—Northern Screened Rock Salt |
| --- | --- |
| Average brine impurity pickup at 4.44 minutes contact time and 60 grams $CaSO_4$ per liter brine exposure ratio—0.1121 grams per liter calcium and magnesium as $CaSO_4$. | Average brine impurity pickup at 4.45 minutes contact time and 60 grams $CaSO_4$ per liter brine exposure ratio—0.728 grams per liter $CaSO_4$. |

While the invention as described heretofore is particularly advantageous with the use of the Southern type rock salt which generally contains a high proportion of calcium sulfate in the anhydrite form and in relatively large particles, the principles of the invention are applicable to other types of rock salt which contain calcium sulfate as an impurity.

Those modifications and equivalents which fall within the spirit of the invention and the scope of the appended claims are to be considered part of the invention.

We claim:

1. A process for producing substantially saturated brine which comprises passing substantially sodium chloride-free water at a temperature between about 40 to about 80° F. upwardly through a stationary bed of Southern mine run rock salt to form said brine, said rock salt being characterized by a calcium sulfate content about 96% of which is the anhydrite form and at least about 80% of which has a particle size substantially within the range from about 40 to about 140 mesh U.S. sieve series, limiting the time the water is in contact with said rock salt to from about 2 to about 10 minutes, and maintaining the amount of calcium sulfate sludge in contact with the brine to not more than from about 20 to about 40 grams of calcium sulfate per liter of brine.

2. The process of claim 1 wherein the time that the water is in contact with the rock salt is from about 2 to about 4 minutes.

3. The process of claim 1 wherein the velocity of water flow through the rock salt bed is not substantially more than 1 foot per minute.

References Cited

UNITED STATES PATENTS

| 1,589,519 | 6/1926 | Dolbear | 23—312 |
| 2,281,140 | 4/1942 | Courthope | 23—267 X |
| 2,734,804 | 2/1956 | Courthope | 23—312 |
| 3,130,016 | 4/1964 | Grier | 23—312 |
| 3,168,379 | 2/1965 | Miller | 23—312 |
| 3,236,609 | 2/1966 | MacKinnon | 23—312 |

FOREIGN PATENTS

| 511,795 | 4/1955 | Canada. |
| 556,684 | 4/1958 | Canada. |

NORMAN YUDKOFF, *Primary Examiner.*

S. EMERY, *Assistant Examiner.*

UNITED STATES PATENT OFFICE
CERTIFICATE OF CORRECTION

Patent No. 3,363,995                              January 16, 1968

Thomas E. Driskell et al.

It is hereby certified that error appears in the above numbered patent requiring correction and that the said Letters Patent should read as corrected below.

Column 5, TABLE II, second column, line 2 thereof, for "4.45" read -- 4.485 --.

Signed and sealed this 4th day of March 1969.

(SEAL)
Attest:

Edward M. Fletcher, Jr.                                EDWARD J. BRENNER
Attesting Officer                                           Commissioner of Patents